United States Patent Office 3,156,553
Patented Nov. 10, 1964

3,156,553
COMPOSITION AND METHOD FOR THE CONTROL OF WEEDS
Norman E. Searle, Wilmington, Del., assignor to E. I. du Pont de Nemours and Company, Wilmington, Del., a corporation of Delaware
No Drawing. Filed May 1, 1961, Ser. No. 106,535
2 Claims. (Cl. 71—2.6)

This invention relates to novel polysubsttiuted benzoyl chlorides. It is more particularly directed to benzoyl chlorides substituted with chlorine and methyl groups and to compositions and methods for their use as herbicides.

The compounds of this invention are represented by the following formula:

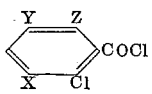

where
X is hydrogen or chlorine,
Y is hydrogen, chlorine, or methyl, and
Z is chlorine or methyl, providing, however, that one of Y and Z must be methyl and one of X and Y is not hydrogen.

This formula embraces the following compounds:

2,5-dichloro-6-methylbenzoyl chloride
2,3,5-trichloro-6-methylbenzoyl chloride
2,6-dichloro-5-methylbenzoyl chloride
2,3,6-trichloro-5-methylbenzoyl chloride
2-chloro-5,6-dimethylbenzoyl chloride
2,3-dichloro-5,6-dimethylbenzoyl chloride
2,3-dichloro-6-methylbenzoyl chloride The compounds of this invention are prepared by the reaction of a properly substituted benzoic acid with thionyl chloride, phosphorus trichloride or tribromide, or phosphorous pentachloride, according to the following equations:

(1)
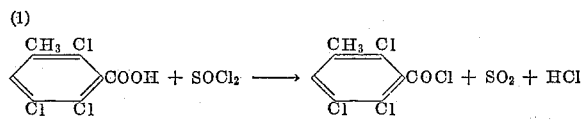

(2)
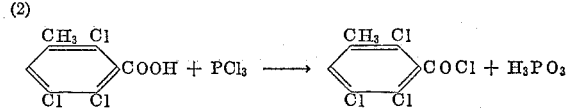

(3)
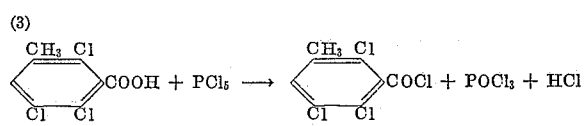

Although the foregoing equations show reactions of 2,3,6-trichloro-5-methylbenzoic acid to give corresponding benzoyl chlorides, it should be understood that a benzoic acid starting material, substituted in any way necessary to obtain the desired configuration in the benzoyl chloride product, will work equally well.

The thionyl chloride method of Equation 1 is preferred. In this method, 4 to 6 molar equivalents of thionyl chloride are used for each molar equivalent of substituted benzoic acid. Since it is present in excess, the thionyl chloride acts as a solvent for the reaction. Other inert solvents such as xylene, or toluene can be used, but give lower yields.

The mixture of thionyl chloride and substituted benzoic acid is heated to reflux until the evolution of gaseous HCl and $SO_2$ ceases; this usually takes about 4 hours. Excess thionyl chloride is removed by distillation. The substituted benzoyl chloride product is obtained by further distillation under reduced pressure.

The $PCl_5$ method of Equation 3 is run by mixing approximately equimolar proportions of $PCl_5$ and the substituted benzoic acid. After the initial reaction has subsided, the mixture is heated on a steam bath until the evolution of HCl ceases. Phosphorus oxychloride is removed from the mixture by evaporation under reduced pressure at steam bath temperature. The residue is distilled at reduced pressure to give pure substituted benzoyl chloride product.

The $PCl_3$ method of preparation (Equation 2) is run in the same manner as the $PCl_5$ method. Equimolar proportions of substituted benzoic acid and $PCl_3$ are used. The $H_3PO_3$ is washed from the crude reaction product with water, and the residue is then distilled to obtain the pure substituted benzoyl chloride.

In all methods, after the removal of the HCl and excess halide, the resulting product is sufficiently pure to be used directly as a herbicide.

Methods for the preparation of some of the substituted benzoic acid starting materials in Equations 1, 2 and 3 can be found in French Patent No. 1,224,787. Variations on these methods, easily made by one skilled in the art, will give the other benzoic acids.

The compounds of this invention are outstanding herbicides and can be used to control such broadleaf and grassy annual and perennial weeds as yellow foxtail, pigweed, seedling Johnson grass, crabgrass, wild mustard, dandelion, lamb's-quarters and shepherd's purse. They are also effective in controlling perennial woody vines such as Virginia creeper, honeysuckle, and trumpet vine. The compounds are also highly effective as soil sterilants, and when used properly, can render soil free of vegetation for prolonged periods.

The substituted benzoyl chlorides of this invention have low volatility characteristics as contrasted with the free benzoic acid. This reduces the volatility problem encountered when hormonal-type herbicides are applied in proximity to sensitive crops.

In order that the compounds of this invention be used to their best advantage as herbicides, they should be formulated with pest-control adjuvants. Such adjuvants and methods for formulating active ingredients with them are disclosed in U.S. Patents Nos. 2,655,444–447; 2,843,470; 2,849,306; 2,854,325; 2,895,817; and the patents cited therein. The portions of these patents which disclose such adjuvants and methods are hereby incorporated into this application by reference.

The substituted benzoyl chlorides should be present in the compositions at concentrations of from 0.5% to 95%. The exact amount will depend on the composition's intended use and can be easily determined by one skilled in the art.

The compositions thus formulated must naturally be applied in amounts sufficient to exert the desired herbicidal action. The precise amount applied in any instance will, of course, depend on such factors as climate, the type of soil to be treated, the type of plant to be treated and the stage of its growth, and the like. Generally, however, application of a composition in an amount sufficient to provide from 1.5 to 60 pounds of the substituted benzoyl chlorides per acre will give satisfactory results. Rates of from 1.5 to pounds per acre give excellent preemergence weed control. Perennial woody vines and bindweed are controlled at rates of from 5 to 20 pounds per acre.

The following examples are presented so that this invention may be more easily understood and more readily practiced.

Example 1

A total of 205 parts by weight of 2,3-dichloro-6-methylbenzoic acid is combined with 500 parts by weight of thionyl chloride. This mixture is heated at reflux temperature under anhydrous conditions until hydrogen chloride and sulfur dioxide cease to evolve from the reaction. Excess thionyl chloride is removed by distillation and further distillation of the residue under reduced pressure yields 210 parts by weight of essentially pure 2,3-dichloro-6-methylbenzoyl chloride.

This compound is prepared as a wettable powder according to the following formula:

| | Percent |
|---|---|
| 2,3-dichloro-6-methylbenzoyl chloride | 25 |
| Polyoxyethylene esters of mixed fatty and resin acids | 2 |
| Attapulgite clay | 73 |

Two parts of the surfactant are mixed with 25 parts of the active oil. This is then blended with 73 parts of attapulgite clay and the mixture is micropulverized twice.

When applied at 20 pounds of active ingredient per acre in 100 gallons of water to an infestation of bindweed and Russian knapweed, excellent control of these weeds is obtained. Isolated clumps of honeysuckle, wild mustard and pigweed are also controlled.

Example 2

A total of 239.5 parts by weight of dry 2,3,5-trichloro-6-methylbenzoic acid is mixed with 208.5 parts of powdered phosphorous pentachloride. After the initial reaction has subsided, the mixture is heated on a steam bath for about an hour. The phosphorous oxychloride is then removed by evaporation on a steam bath, using a water pump. The residue is essentially pure 2,3,5-trichloro-6-methylbenzoyl chloride.

This benzoyl chloride can be prepared as an emulsifiable oil according to the following formula:

| | Percent |
|---|---|
| 2,3,5-trichloro-6-methylbenzoyl chloride | 30 |
| Mixed polyoxyethylene ethers of fatty alcohols and oil soluble petroleum sulfonates | 5 |
| Alkylated naphthalenes | 65 |

This formulation can be emulsified in water and sprayed, or it can be diluted with herbicidal oils and applied as an oil spray.

When applied in 100 gallons of water at the rate of 40 pounds of active ingredient per acre, this formulation gives excellent control of crabgrass, pigweed, shepherd's purse, flower-of-an-hour, Virginia creeper, trumpet vine, and bouncing bet. Extended residual effects are noted.

Example 3

Phosphorous trichloride (137.5 parts by weight) is gradually added to 239.5 parts of 2,5-dichloro-6-methylbenzoic acid and the mixture is heated until hydrogen chloride evolution stops. The phosphoric acid is removed from the reaction mixture by cooling and diluting the mixture with water. The product is separated, dried over anhydrous magnesium sulfate and filtered to give essentially pure 2,5-dichloro-6-methylbenzoyl chloride.

Herbicidal granules are prepared with this benzoyl chloride by spraying it on tumbling granulated attapulgite, according to the following formula:

| | Percent |
|---|---|
| 2,5-dichloro-6-methylbenzoyl chloride | 20 |
| Granular 8-20 mesh attapulgite | 80 |

This formulation can be used for the "spot treatment" of bindweed, Russian knapweed, Virginia creeper, trumpet vine, and honeysuckle. Rates of from 12 to 25 pounds of active ingredient per acre give excellent control.

When prepared in the same manner to give a 4% formulation, this compound, applied at 1.5 to 4 pounds per acre, gives good pre-emergence control of crabgrass, pigweed and mustard in an established Kentucky 31 Fescue lawn.

This application is a continuation-in-part of copending application Serial No. 812,085, filed May 11, 1959, now abandoned, which, in turn, is a continuation-in-part of application Serial No. 620,997, filed November 8, 1956, and now abandoned.

The embodiments of the invention in which an exclusive property or privilege is claimed are:

1. A composition comprising a herbicidal amount of a compound selected from the group consisting of 2,5-dichloro-6-methylbenzoyl chloride; 2,3,5-trichloro-6-methylbenzoyl chloride; 2,6-dichloro-5-methylbenzoyl chloride; 2,3,6-trichloro-5-methylbenzoyl chloride; 2-chloro-5,6-dimethylbenzoyl chloride; 2,3-dichloro-5,6-dimethylbenzoyl chloride; and 2,3-dichloro-6-methylbenzoyl chloride and less than 6% by weight of a surface-active agent.

2. A method for the control and destruction of weeds comprising applying to an area to be protected, a herbicidal amount of a compound selected from the group consisting of 2,5-dichloro-6-methylbenzoyl chloride; 2,3,5-trichloro-6-methylbenzoyl chloride; 2,6-dichloro-5-methylbenzoyl chloride; 2,3,6-trichloro-5-methylbenzoyl chloride; 2-chloro-5,6-dimethylbenzoyl chloride; 2,3-dichloro-5,6-dimethylbenzoyl chloride; and 2,3-dichloro-6-methylbenzoyl chloride.

References Cited in the file of this patent

UNITED STATES PATENTS

| 2,181,554 | Kracker | Nov. 28, 1939 |
| 2,394,916 | Jones | Feb. 12, 1946 |
| 2,726,947 | Baumgartner | Dec. 13, 1955 |
| 2,865,959 | Toland | Dec. 23, 1958 |
| 3,014,965 | Newcomer et al. | Dec. 26, 1961 |
| 3,044,866 | Krewson | July 17, 1962 |

OTHER REFERENCES

Beilstein: Organische Chemie, Band 9, System 891–1050, pages 345–6, 1926.

Thompson et al., in "Botanical Gazette," vol. 107, 1946, pages 475–507 (pages 489, 490, 493 and 495 of special interest).

"Plant Regulators," CBCC Positive Data Series, No. 2, June 1955, publication 384, pages a, b, c, 1 and 22.